Figure 1:
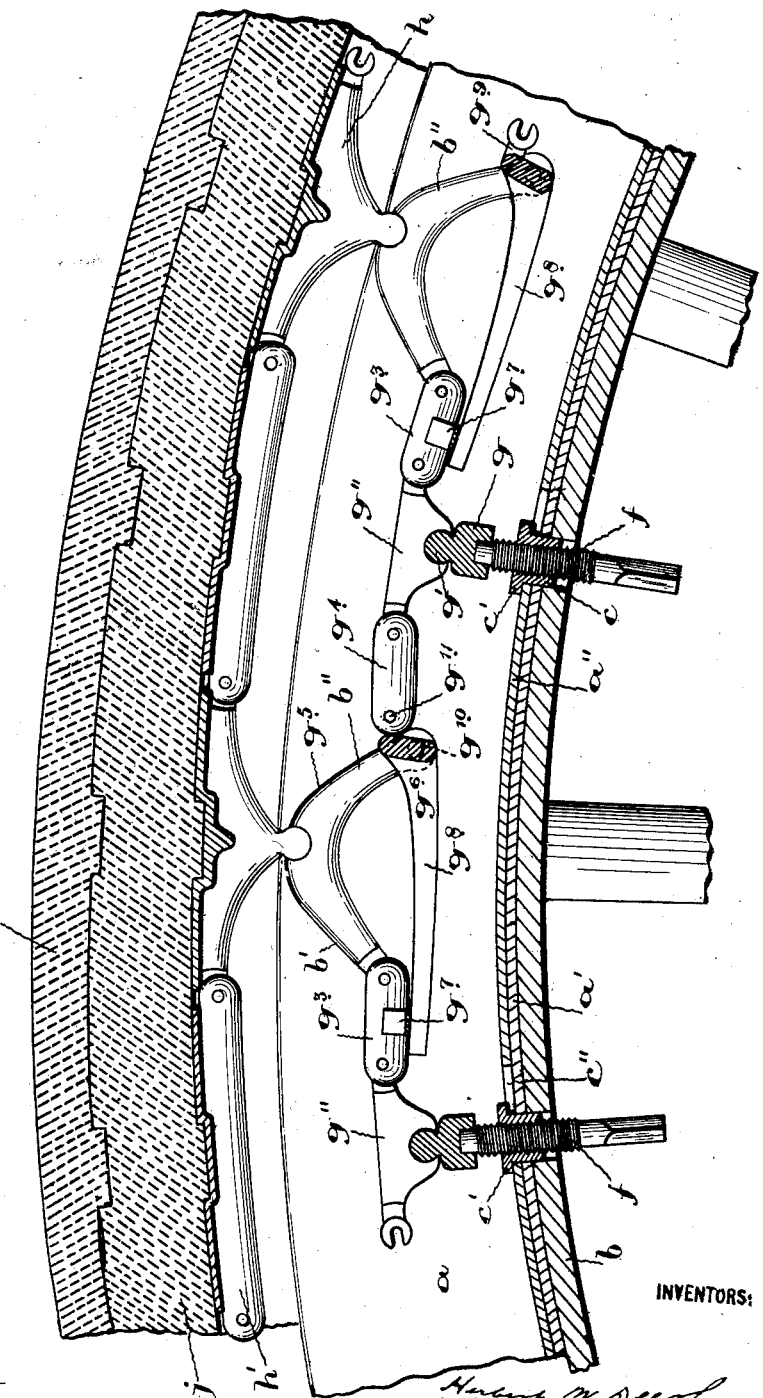

H. M., T. J., W. J. & H. N. DEETH.
RESILIENT TIRE.
APPLICATION FILED FEB. 5, 1910.
983,270.
Patented Feb. 7, 1911.
3 SHEETS—SHEET 2.
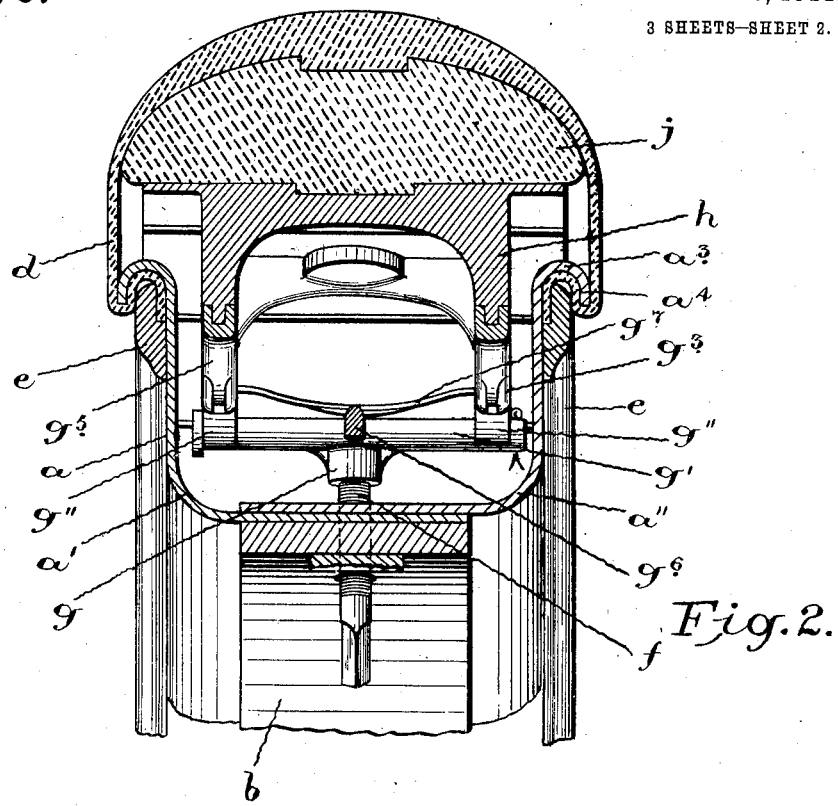
Fig. 2.
Fig. 5.
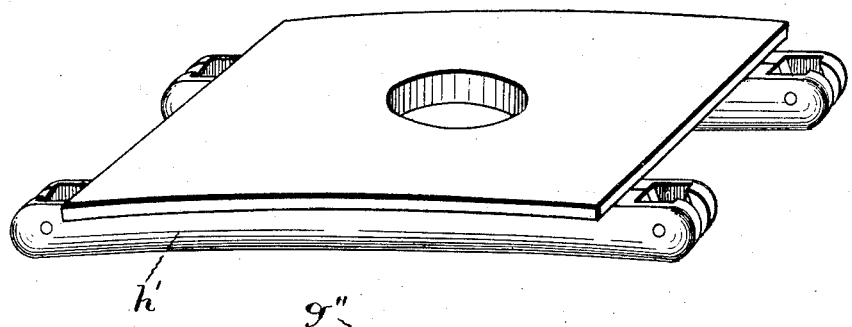
Fig. 8.
WITNESSES:
INVENTORS:

H. M., T. J., W. J. & H. N. DEETH.
RESILIENT TIRE.
APPLICATION FILED FEB. 5, 1910.
983,270.
Patented Feb. 7, 1911.
3 SHEETS—SHEET 3.
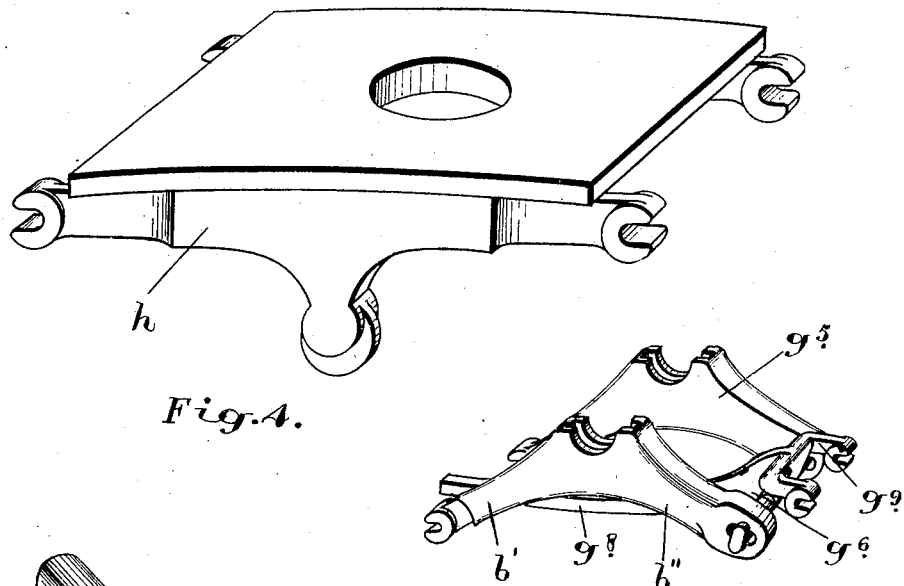
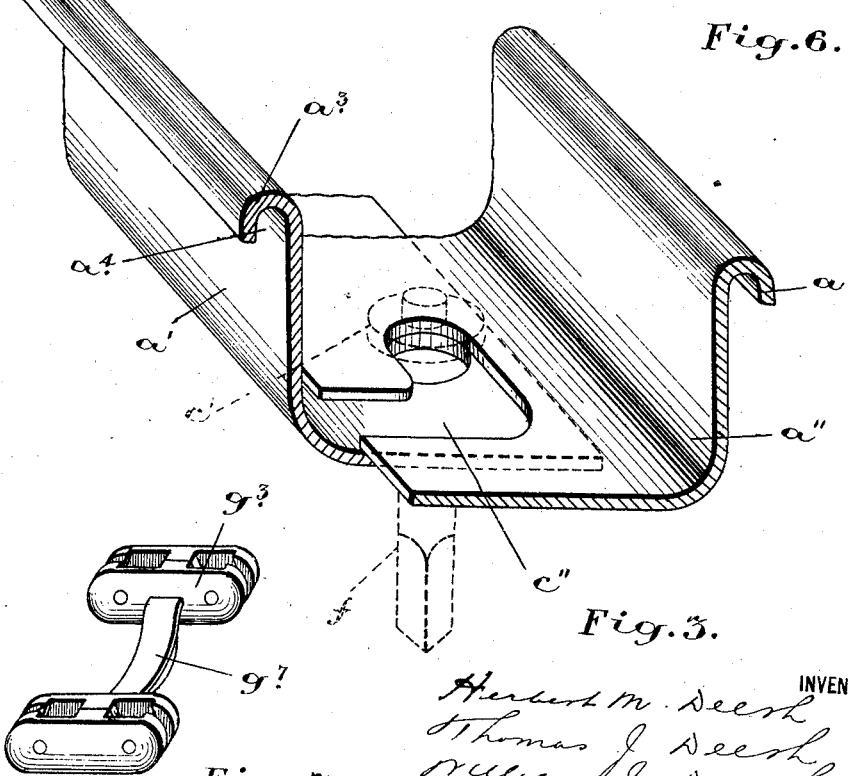

UNITED STATES PATENT OFFICE.

HERBERT M. DEETH, THOMAS JOHN DEETH, WILLIAM JAS. DEETH, AND HARVEY NELSON DEETH, OF TORONTO, ONTARIO, CANADA.

RESILIENT TIRE.

983,270.  Specification of Letters Patent.  Patented Feb. 7, 1911.

Application filed February 5, 1910. Serial No. 542,209.

*To all whom it may concern:*

Be it known that we, HERBERT MILTON DEETH, THOMAS JOHN DEETH, WILLIAM JAMES DEETH, and HARVEY NELSON DEETH, all of the city of Toronto, Province of Ontario, Canada, have invented certain new and useful Improvements in Resilient Tires; and we hereby declare that the following is a full, clear, and exact description of the same.

This invention relates to a resilient tire consisting of a flexible shoe expanded into circular form by resilient expanding means which can be tensioned to the load the wheel will be required to carry, the expanding means being constructed of articulatingly connected sections flexibly suspended between their articulating supports and capable of acting separately and in unison with each other when yielding to the impact on the tire and restoring it to its normal shape.

For an understanding of the invention reference is to be had to the following description and to the accompanying drawings in which:

Figure 1, is a section of part of the tire. Fig. 2, is a section taken at right angles to Fig. 1. Fig. 3, is a perspective view of a section of the rim. Fig. 4, is a perspective view of one of the rocker segments of the outer tire member. Fig. 5, is a perspective view of one of the links of the outer tire member. Fig. 6, is a perspective view of one of the arched supporting segments and one of the levers of the inner tire member. Fig. 7, is a perspective view of one of the links and tension springs of the inner tire member, and, Fig. 8, is a perspective view of one of the rocker segments of the inner tire member.

Like characters of reference refer to like parts throughout the specification and drawings.

When the rim $a$ is of a channel shape it is preferable to make it of two circumferentially separable rim sections $a'$ $a''$ of which the rim section $a'$ is permanently connected to the felly $b$, and the rim section $a''$ is securely but removably connected to the rim section $a'$ so that it can be laterally removed from and replaced on the felly to permit of the tire being placed in and removed from the channel of the rim.

A convenient means of separably securing the rim to the wheel is to bolt or rivet the rim section $a'$ to the felly $b$ and to provide the felly and rim section $a'$ with stationary nuts $c$ having on the outer side of the rim section $a'$, shoulders $c'$ with flattened faces, and to form the rim section $a''$ with bayonet joint slots $c''$ to receive the nuts $c$, the shoulders $c'$ being of a sufficient size to overlap the edges of the slots and prevent the radial separation of the rim section $a''$ from the rim section $a'$, the edges of the bayonet joint slots preventing the lateral movement of the rim section $a''$ when the nuts engage with the inner ends of the slots. The edges $a^3$ of the rim $a$ are bent outward to form external channels $a^4$ for the tire cover $d$ which is clamped in the channels by locking rings $e$.

The form or construction of the rim may be varied and modified within the scope of the appended claims without departing from the principle of the invention as any other form or construction of rim suitable for the purpose may be substituted for that shown and described.

Adjustable through the stationary nuts $c$ are tension screws $f$ regulating the resiliency of the tire by varying its expansion from the rim. The tension screws $f$ are provided with caps $g$ having rocker bars $g'$ extending partly across the channel of the rim transversely to the circle of the wheel and mounted on the rocker bars $g'$ are rocker segments $g''$ which form the articulating supports holding the expanding means in flexible suspension. The expanding means consists of a flexible outer tire member and a flexible inner tire member each consisting of a sufficient number of articulatingly connected flexible sections to encircle the rim $a$. Each section of the inner tire member consists of an arched supporting segment $g^5$, to one arm $b''$ of which is fulcrumed a tensioning lever $g^6$, a link $g^3$ flexibly connecting the other arm $b'$ of the arched supporting segment with a rocker segment $g''$ on one side, and a link $g^4$ flexibly connecting the short arm of the tensioning lever with a rocker segment $g''$ on the other side, of the arched supporting segment, the link $g^3$ being provided with a spring engaging the tensioning lever and normally maintaining it and its related parts in a distended condition. A satisfactory construction is to pivot the links $g^3$ $g^4$ to the opposite sides of the rocker segment $g''$ and to pivotally connect the link $g^3$ with the arm $b'$ of the arched supporting segment, and to fulcrum the lever $g^6$ to the arm $b''$ of the arched supporting segment to constitute a long lever arm $g^8$ which engages with the tensioning spring $g^7$, and a short lever arm $g^9$ to which the link $g^4$ is pivotally connected. By thus arranging the arms of the tensioning lever, the strain on the tensioning spring is reduced in the ratio of the lengths of the respective arms of the lever to each other which is of considerable importance in avoiding breakage of the parts.

As shown in Fig. 1, the fulcrums $g^{10}$ for the levers $g^6$ are located near the lower edge of the levers, and the pivotal connections $g^{11}$ for the links $g^4$ are near the top edge of the levers so that during the flexion of the parts the length of the inner tire member section between the articulating supports will be greater than when the parts are in their normal distended condition, thus minimizing the risk of breaking the parts when yielding to the impact on the tire. When the tire is subjected to impact the tire member section in line with the place of impact yields and transmits through its articulating supports a strain to the adjacent sections, and then to the succeeding sections until the force of impact is expended, in this way enabling the parts to yield independently and collectively to cushion the jar resulting from such impact.

The outer tire member consists of the links $h'$ and rocker segments $h$ rockably mounted on the arched supporting segments $q^5$ forming the articulating supports for the outer tire member.

Encircling the outer tire member is the shoe consisting of a band $j$ of rubber or rubber composition, and a tire cover $d$ inclosing the band and the inner and outer tire members, and locked to the rim $a$ by the locking rings $e$. The flexible character of the inner and outer tire members imparts to the tire an active resiliency equal to pneumatic action. Thus when the wheel is traveling on a smooth surface the flexion of the parts of the tire members is almost imperceptible, sufficient only to cushion the vibration, but when the wheel meets an obstacle in its path, the impact of the contact causes the flexion of the links and rocker segments, of the outer tire member, adjacent to the line of impact. The force of the impact is then transmitted by the rocker segment $h$ to its respective arched supporting segment $q^5$ causing the inward radial movement of the latter and the flexion of the links $g^3$ $g^4$. The flexion of the links $g^3$ $g^4$ is resisted by the spring $g^7$ bearing against the lever $g^6$ and the strain is transmitted by the links $g^3$ $g^4$ to the adjacent rocker segments $g''$ and by them in succession to the remaining sections of the inner tire member in gradually diminishing force to a point diametrically opposite the place of impact, the remaining springs $g^7$ and levers $g^6$ offering resistance to the strain caused by the impact and assisting in restoring the parts to their normal position when the strain is relieved. By this means the shock resulting from the impact is gradually and quickly absorbed by each individual part of the tire owing to the flexible character of its construction, and the resiliency of the tire is maintained by the tensioning means consisting of the levers $g^6$ and springs $g^7$ operating to maintain the parts in, and restore them to, their circular condition.

Having thus fully described our invention what we claim as new and desire to secure by Letters Patent is:

1. The hereinbefore described device consisting of an inner tire member comprising arched supporting segments, tensioned levers fulcrumed to the arched supporting segments, rocker segments, links connecting the rocker segments to the arched supporting segments and to the levers, and supporting means for the rocker segments, and an outer tire member comprising flexibly connected segments yieldingly held by the arched supporting segments.

2. The hereinbefore described device consisting of an inner tire member comprising arched supporting segments, tensioned levers fulcrumed to the arched supporting segments, rocker segments, links connecting the rocker segments to the arched supporting segments and to the levers, and supporting means for the rocker segments, and an outer tire member comprising rocker segments articulatingly held by the arched supporting segments, and links connecting the rocker segments.

3. The hereinbefore described device consisting of an inner tire member comprising arched supporting segments, tensioned levers fulcrumed to the arched supporting segments, rocker segments, links connecting the rocker segments to the arched supporting segments and to the levers, rocker bars for the rocker segments, and adjusting screws for the rocker bars, and an outer tire member comprising flexibly connected segments yieldingly held by the arched supporting segments.

4. The hereinbefore described device consisting of an inner tire member comprising arched supporting segments, tensioned levers fulcrumed to the arched supporting segments, rocker segments, links connecting the rocker segments to the arched supporting segments and to the levers, rocker bars for the rocker segments, and adjusting screws for the rocker bars, and an outer tire member comprising rocker segments articulatingly held by the arched supporting segments and links connecting the rocker segments.

Toronto, January 15th, 1910.
 HERBERT M. DEETH.
 THOMAS JOHN DEETH.
 WILLIAM JAS. DEETH.
 HARVEY NELSON DEETH.
Signed in the presence of—
 C. H. RICHES,
 H. C. TRIMBLE.